2 Sheets--Sheet 1.

W. W. CAREY & G. W. HARRIS.

Planing-Machines.

No. 6,171. Reissued Dec. 15, 1874.

Witnesses
S. N. Piper
L. N. Miles

Wilson W. Carey.
George W. Harris.
by their attorney.
R. H. Eddy

W. W. CAREY & G. W. HARRIS.

Planing-Machines.

No. 6,171. Reissued Dec. 15, 1874.

Witnesses
S. N. Piper
L. N. Miles

Wilson W. Carey
George W. Harris
by their attorney
N. Eddy

UNITED STATES PATENT OFFICE.

WILSON W. CAREY AND GEORGE W. HARRIS, OF LOWELL, MASS.

IMPROVEMENT IN PLANING-MACHINES.

Specification forming part of Letters Patent No. 99,157, dated January 25, 1870; reissue No. 6,171, dated December 15, 1874; application filed July 15, 1874.

*To all whom it may concern:*

Be it known that we, WILSON W. CAREY and GEORGE W. HARRIS, both of Lowell, in the county of Middlesex and State of Massachusetts, have invented new and useful Improvements in Planing-Machines; and we do hereby declare that the following is a full and exact description thereof, reference being had to the accompanying drawings, and to the letters of reference marked thereon.

The nature of our invention in planing-machines consists in a bed-piece or table, formed in two parts, each of which is pivoted at the same distance from the center of the cylinder, with cutters, they (the said parts) being so operated, by a screw, as to depress the front part and elevate the back part of the table simultaneously, thus keeping the top surfaces of the same parallel to and with each other. It further relates to the device for removing the pressure feed-rolls, as hereinafter described. It further relates to the combination of an adjustable gage or rest, substantially as hereinafter described, with the table or tables, and the planing-cylinder.

To enable others skilled in the art to make and use our invention we will proceed to describe its construction and operation.

Figure 1:
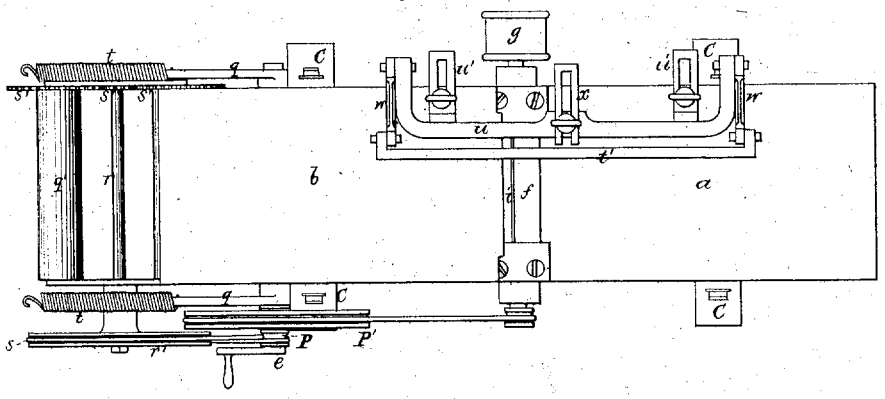
Figure 2:
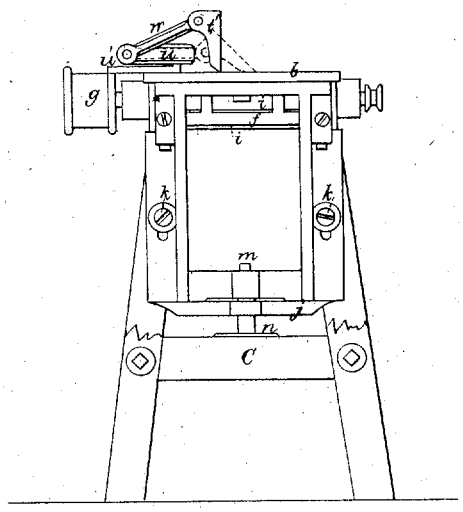
Figure 3:
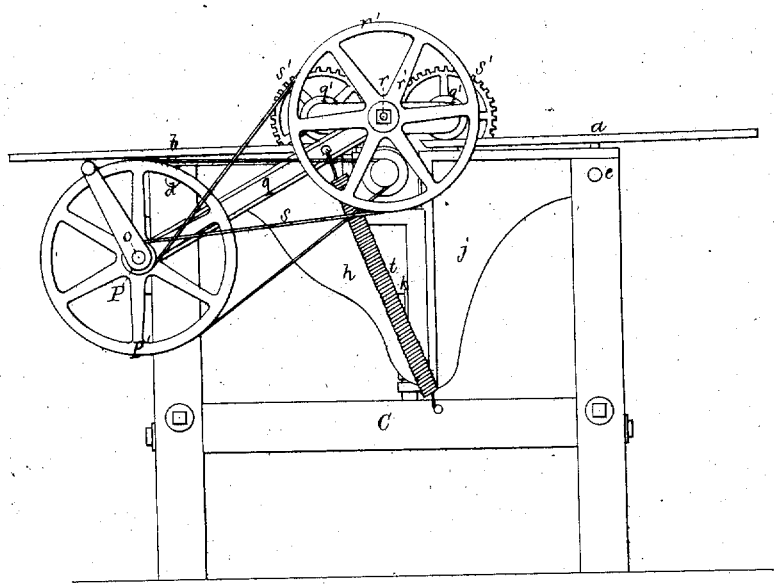
Figure 4:
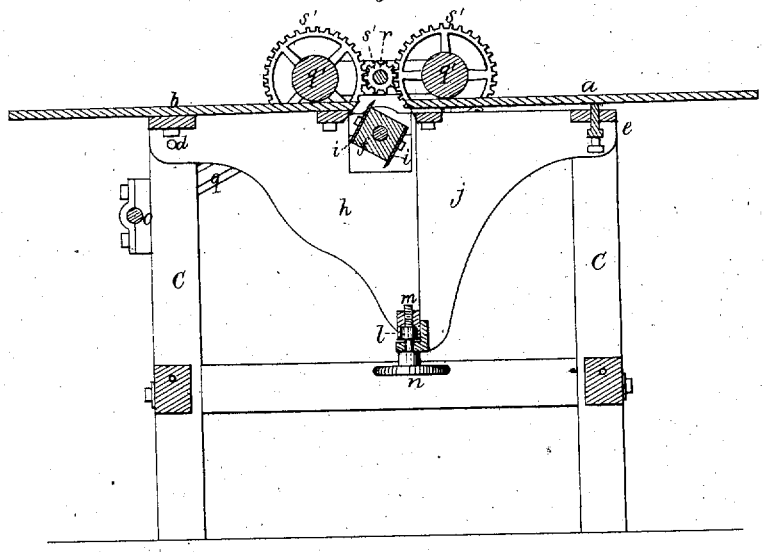

Figure 1 represents a plan of our improved planing-machine. Fig. 2 is a view of the back end, with parts of the frame removed; Fig. 3, a side elevation; Fig. 4, a longitudinal section.

Similar letters in the different figures indicate corresponding parts.

In the construction of our improved planing-machine, *a* and *b* indicate the front and back parts of the table or bed-piece, which are attached or secured to the frame C by means of the pivots or bearings *d d* and *e e*, on which they operate. Both parts of the bed-piece *a* and *b*, swinging on the pivots *d d* and *e e*, are located the same exact distance from the center of the cylinder *f*, which cylinder is provided with bearings working in boxes, they being adjustable. Said cylinder also has cutters *i i* in the usual manner, they being adjusted and secured to the cylinder *f* so that the cutting-edges of such cutters may run true and properly with the surface of the back part *b* of the table. *g* represents the driven pulley, from which motion is communicated throughout the working parts of the machine. Formed on or attached to the front and back parts of the table *a* and *b*, are suitable stands *h* and *j*, which work in slides, and are controlled by guide screws or pins *k k*, as shown in Fig. 2 of the drawings. These stands *h* and *j*, at their lower parts, are furnished with a socket and nut, in which operate the collar *l* and screw *m*, by means of the hand-wheel *n*, such enabling an operator to depress the front part *a* of the table, and elevate the back part *b* thereof simultaneously, thus keeping the surfaces of the same always parallel or in parallel planes. Located and secured to the back part of the frame *c* are suitable boxes, in which operates the counter-feed shaft *o*, on one end of which is secured the driving and driven feed-pulleys P and P′. Attached to this shaft, and operating on the same, is the swinging frame *q q*, in which is mounted the pressure feed-rolls *q′ q′*, the frame being provided with the intermediate shaft *r*, which is furnished with a pulley, *r′*. This pulley connects with the driving feed-pulley P by means of the belt *s*, the feed-rolls *q′ q′* receiving motion from the shaft *r* by means of the gears *s′ s′ s′*, the required pressure being produced, when the rolls are in operation, by means of the springs *t t*, or weights.

In using our improved planing-machine as a surface-planer the feed-rolls *q′ q′*, by aid of the swinging frames *q q*, are placed in position, as shown in Figs. 2 and 3 of the drawings, which brings them in contact with the material to be planed, thus feeding it toward the cutters *i i*, as may be desired, the required amount of pressure being given to the feed-rolls *q′ q′* by means of the springs *t t* or weights. The cutters *i i* on the cylinder *f*, having previously been adjusted so that their cutting-edges may be true and even with the surface of the back part *b* of the table, the operator is enabled to regulate the cut or chip to be removed from the material at will, by aid of the hand-wheel *n* and screw *m*, by which he can depress the front part *a* and elevate the back part *b* of the table, without altering their parallel position with each other. Thus, during the entire operation of planing the material, the full unplaned surface thereof comes in contact with and slides on the back part *b* of the table; and this important and particular feature in the operation is unchanged, and holds good, whether the chip to be removed is heavy or light.

When our improved device is used for edging, squaring, taking out of wind, beveling, and other purposes, the feed-rolls $q'$ $q'$ are removed from the table $a$ and $b$ by means of the swinging frame $q$ $q$, as shown in Fig. 1 of the drawings, the same being swung over the back part $b$ of the table; and the portable adjustable rest is secured to the table, and the guide $t'$ is adjusted in any position, angle, or bevel required, as shown in Fig. 2 of the drawings. This adjustable rest consists of a base, $u$, which is provided with slotted feet $u'$ $u'$. $t'$ is the guide, with knife-edge, this guide being connected or hinged to the base $u$ by means of the arms $w$ $w$, also pivoted to the guide, the same being adjustable, and the whole being held in any required position by means of the circular slotted hinged strap $x$.

When the rest is used the material to be planed is fed by hand, and the same readily finished, leaving it perfectly straight, smooth, and out of wind.

Thus, with our improved device, we are enabled to furnish a planing-machine that can be adapted to various purposes, and the depth of cut or chip to be removed regulated and governed by the adjustable table, from three-eighths of an inch cut to the finest or thinnest shaving, without being compelled to resort to the usual method to adjust or elevate the cutters.

What we claim as our invention in the planing-machine, and desire to secure by Letters Patent, is—

1. The table, having its top composed of the two platforms $a$ $b$ applied to the frame $c$, arranged with the cutter-cylinder, and provided with mechanism for operating them, all being substantially as described.

2. The adjustable gage or rest, in combination with the planing-cylinder and the adjustable table $a$ $b$, all being arranged and to operate essentially as specified.

3. The combination of the swinging frame $q$ $q$, its feed-rollers $q'$ $q'$, gears $s$, and springs $t$, with the cutter-cylinder, and the compound table $a$ $b$, all being constructed and arranged substantially in manner, and to operate as specified.

WILSON W. CAREY.
G. W. HARRIS.

Witnesses:
J. G. PEABODY,
M. N. PEABODY.